United States Patent
Bright et al.

[15] 3,702,600
[45] Nov. 14, 1972

[54] POULTRY LOADING APPARATUS

[72] Inventors: Charles R. Bright; Walter L. Harris, both of 803 West Seale Street, Nacogdoches, Tex. 75961

[22] Filed: Dec. 9, 1970

[21] Appl. No.: 96,535

[52] U.S. Cl. ................................................. 119/82
[51] Int. Cl. .......................................... A01k 29/00
[58] Field of Search ..119/82, 21; 198/193, 233, 184; 280/411 B, 462

[56] References Cited

UNITED STATES PATENTS 3,389,780  6/1968  Jerome ..................... 119/82 X
2,597,220  5/1952  Appel ..................... 280/462 X
3,420,211  1/1969  Hartrikson ..................... 119/82
2,604,874  7/1952  Forbes et al. ............. 119/21 X
3,542,188  11/1970  Kinney, Jr. ................. 198/193

Primary Examiner—Hugh R. Chamblee
Attorney—Pravel, Wilson & Matthews

[57] ABSTRACT

A new and improved poultry loading apparatus is provided for loading and unloading poultry and fowl, such as turkeys, chickens and the like, onto vehicles or other structures.

11 Claims, 7 Drawing Figures

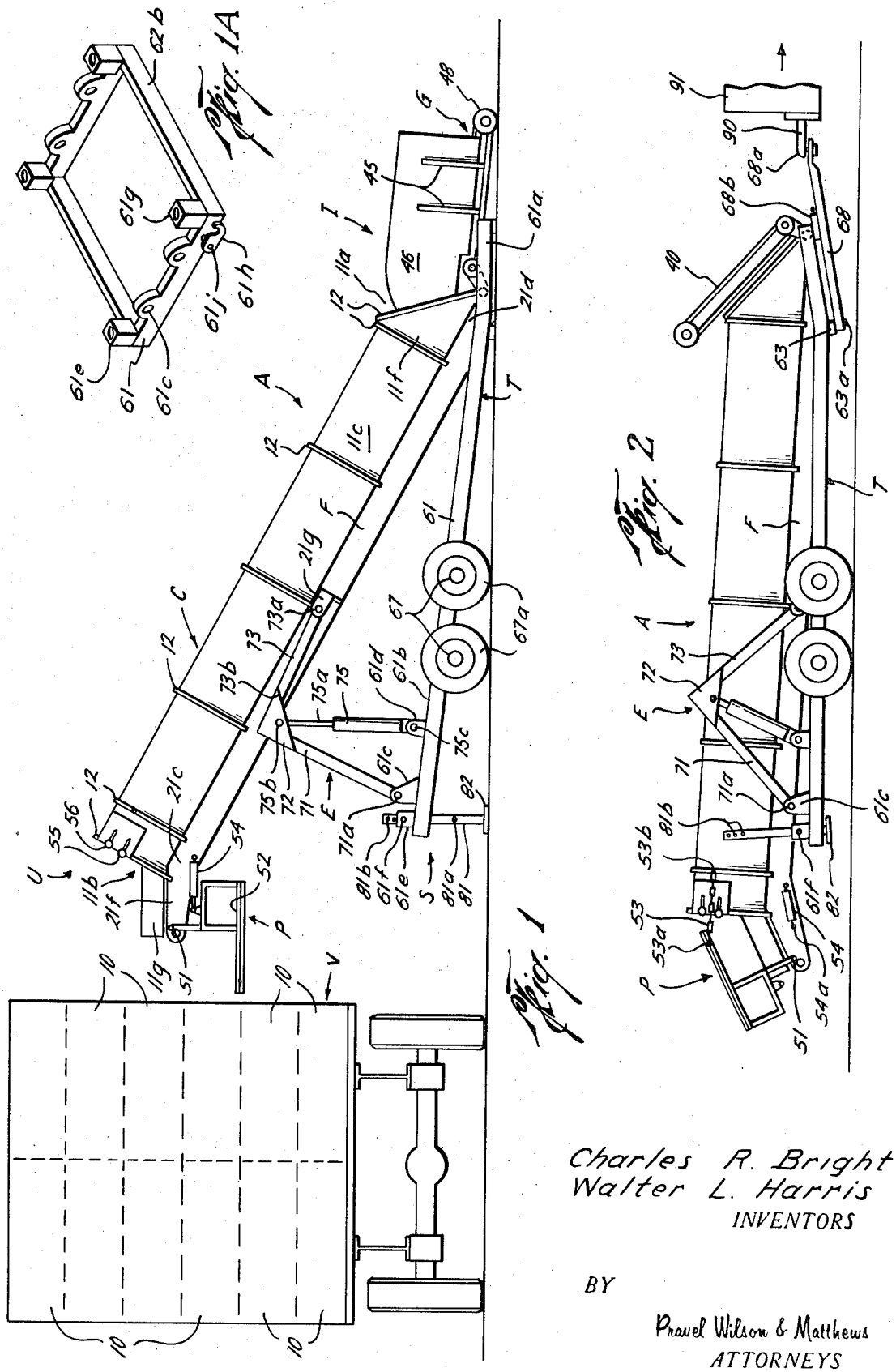

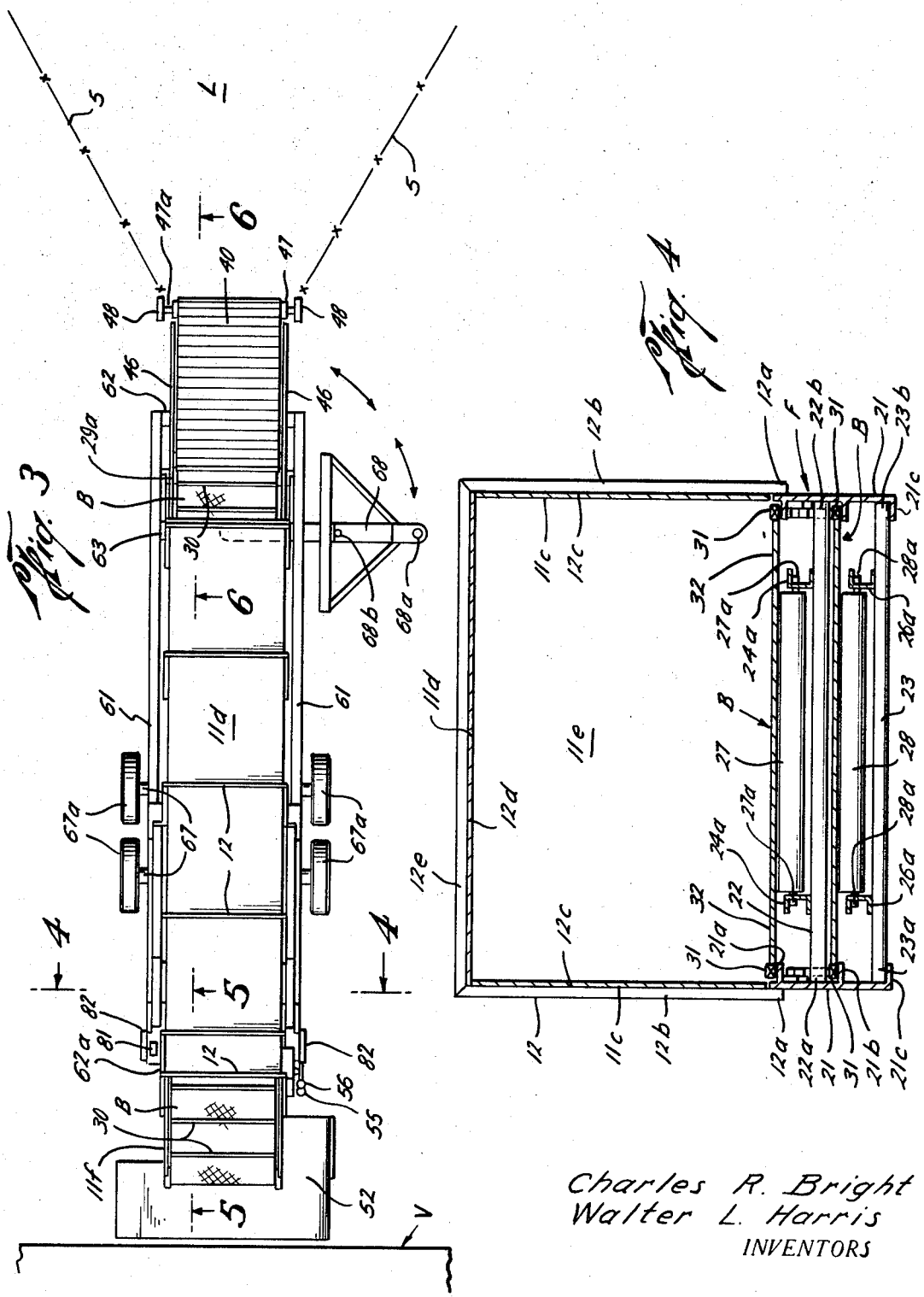

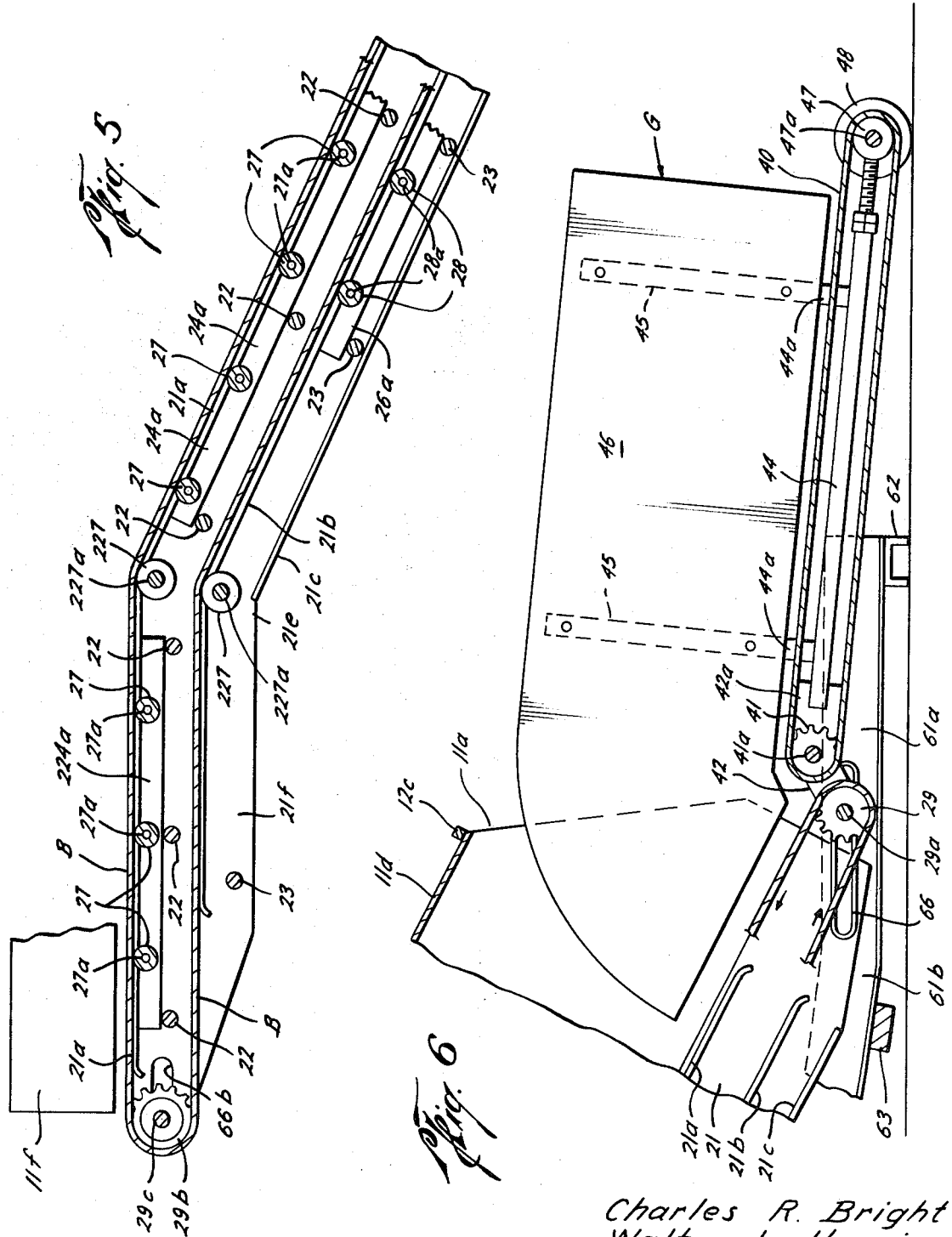

POULTRY LOADING APPARATUS

BACKGROUND OF THE INVENTION

1. Field of the Invention

The present invention relates to apparatus for loading and unloading fowl, poultry and the like on vehicles.

2. Description of the Prior Art

In the prior art poultry loaders, such as those disclosed in U.S. Pat. Nos. 3,389,780 and 3,452,718, the turkeys or poultry being loaded would often become balky and unruly and refuse to enter the loader which was relatively high off the ground with respect to the turkeys, and consequently the poultry had to be kicked or otherwise forced onto the loader, resulting in some bruises and thus injury to the birds, loss of time in loading the birds thus causing increased loading and unloading cost due to wasted time.

The conveyor belts in the prior art poultry loaders also caused problems. The solid belts with no openings therein became covered with feathers and droppings during use and presented a health and sanitation problem to both workers and poultry, while those using wooden slats would often catch the legs of the birds and injure or kill the birds so caught, causing expensive loading delays while untangling the birds from such belts as well as loss of the injured birds.

Further the solid conveyor belt and wooden slats was very hard to clean after use and thus caused continuous sanitation problem as well as having to be continuously replaced.

Also, the prior art loaders, when elevated to high levels to load upper fowl crates on the truck or other transport vehicle, were sometimes unstable and thus possibly dangerous and harmful to the coopers or loaders who transferred the poultry from the loader to the crates.

SUMMARY OF THE INVENTION

Briefly, the present invention provides a new and improved poultry loading apparatus which eliminates the likelihood of having to force poultry into the apparatus during loading, with consequent bruises to the birds and downgrading the quality of such birds, by positioning the input or loading end of the apparatus more closely to the ground using a pivotally mounted connector which pivots out of alignment with the frame on which the apparatus is mounted and allows the loading end to move more closely to the ground. A galvanized woven wire conveyor belt moves from the loading end to an unloading end and permits the birds to grasp such with their feet and obtain a firm and stable footing on such belt without entangling their wings, legs, necks and the like in such belt. A plurality of movable and retractable support brace arms together with a tandem axle of the transporting unit of the loading apparatus stabilize and support the apparatus when the loading chute is being moved and elevated during loading and unloading operations.

It is an object of the present invention to provide a new and improved poultry loading apparatus.

It is an object of the present invention to provide a new and improved poultry loading apparatus which reduces the likelihood of bruises, with resultant downgrading of the quality of the meat, caused by kicking or otherwise forcing the poultry onto the loader which provides a new and improved and economical apparatus for loading fowl and poultry.

It is an object of the present invention to provide a poultry loading apparatus which reduces the loading, health and sanitation problems of loading turkeys.

It is an object of the present invention to provide a poultry loading apparatus with increased stability when the loading chute is being moved and when such chute is elevated during loading.

BRIEF DESCRIPTION OF THE DRAWINGS

FIG. 1 is an elevation view of the poultry loading apparatus of the present invention in its elevated position relative to a truck;

FIG. 1A is an isometric view of an alternative stabilizing support means for the apparatus of FIG. 2, FIG. 2 is an elevational view of the poultry loading apparatus of the present invention for transportation to a location to be used;

FIG. 3 is a top elevation view of the poultry loading apparatus of FIG. 1;

FIG. 4 is a cross-sectional view taken along the lines 4—4 of FIG. 3;

FIG. 5 is a cross-sectional view taken along the lines 5—5 of FIG. 3; and

FIG. 6 is a cross-sectional view taken along the lines 6—6 of FIG. 3.

DESCRIPTION OF PREFERRED EMBODIMENT

In the drawings, the letter A designates generally the poultry loading apparatus of the present invention for loading and unloading poultry such as turkeys, chickens and the like from a poultry pen or lot to transport crates or coops positioned on a suitable vehicle V, such as a trailer, truck or the like for shipment or delivery. The loading apparatus A may also be used to facilitate poultry vaccination and artificial insemination operations by channeling and conveying the poultry to the personnel performing such operations, as will be more evident later.

The poultry loading apparatus A includes a chute C, enclosing a conveyor belt B (FIG. 3) which is driven by a suitable prime mover or motor such as a gasoline or other internal combustion engine or the like. The poultry are moved by a ground conveyor or starting conveyor G from a poultry lot or pen L (FIG. 3) enclosed by a fence 5 into an inlet and I including an entrance or front end 11a of the chute C and moved by the belt B through the chute C to an unloading end U which includes an exit or rear end 11b of such chute. Coopers or loaders standing on a loading platform P guide and move the poultry from the unloading end U of the loading apparatus A into the coops or crates 10 on the vehicle V for transportation or shipment.

The chute C is mounted to a conveyor belt support frame F. The support frame F is mounted at a front or lower end 21d to a transporting trailer frame T and to the ground conveyor G. An elevation adjusting means E adjusts the separation between the trailer frame T and the belt support frame F and consequently raises and lowers the rear or unloading end U of the apparatus A to move such rear end adjacent the coop 10 to be loaded with poultry. A stabilizing support means S is mounted with the trailer frame E to stabilize the loading apparatus A, as will be more evident later.

The chute C (FIGS. 1–4) is made of wood, metal or other suitable material and includes a pair of side walls 11c extending upwardly from the conveyor belt B and a roof 11d extending between the side walls 11c. The side walls 11c and roof 11d extend along the entire length of the chute C from a front end 11a to a rear end 11b and have no holes, apertures, windows or slits therein, to maintain the interior 11e of the chute C dark and thereby prevent undesired movement and stirring of the poultry while they are being moved through such chute by the conveyor belt B. There are no flaps or strips of material obstructing the rear end 11b, and thus the apparatus A may be used for unloading and loading operations as will be more evident later.

A plurality of inlet panels 11f of the side walls 11c adjacent the front end 11a are similarly solid, and prevent the poultry being loaded from entangling the feet, necks or wings in slots in the side walls and thereby reduce the likelihood of injury or harm to the poultry being loaded. A plurality of outlet panels 11g are mounted at the rear end 11b of the chute C to guide and maintain the poultry on the conveyor belt as they are being guided and moved by the coopers into the coops 10 on the vehicle V, and thus prevent the poultry from moving outwardly away from the coopers as they are being loaded.

A plurality of U-shaped chute mounting brackets 12 are attached at a lower end 12a (FIG. 4) of a side arm member 12b by bolting, welding or other suitable means to the conveyor belt support frame F. The side walls 11c and roof 11d of the chute C are similarly attached to an inner surface 12c of the side arm 12b and an inner surface 12d of a horizontal arm 12e, respectively, of the U-shaped mounting bracket 12.

The conveyor belt support frame F includes a pair of side support frames 21 which are E-shaped in vertical cross-section (FIG. 4). A plurality of upper horizontal support braces 22, which may be pipes, rods, beams or other suitable structural members, are mounted at their respective opposite ends 22a and 22b between an upper flange 21a and a middle flange 21b of each of the E-shaped side support frames 21, along the length of the side support frames 21 (FIG. 5) to support the belt support frame F.

A similar plurality of lower horizontal support braces 23 are mounted at their respective opposite ends 23a and 23b between a lower flange 21c and the middle flange 21b of both of the E-shaped side support frames 21 along the length of the E-shaped side support frames 21 to further support the conveyor belt support frame F. An X-shaped support (not shown) may also be mounted between the side support frames 21 for additional strength of the belt support frame F, if desired.

A plurality of upper roller rails 24a (FIG. 4 and 5) which are channel members, C-shaped in vertical cross-section (FIG. 4), are mounted with the upper horizontal support braces 22 and extend in the direction of the longitudinal axis of the chute C along the length thereof (FIG. 5). A similar pair of lower roller pulley rails 26a are mounted with the lower horizontal support braces 23 and extend longitudinally along the axis of the chute C. A plurality of upper rollers 27 (FIG. 4 and 5) are mounted by bearings 27a in apertures formed in the upper pulley rails 24a along the length of such roller rails and engage and support the belt B as such belt is moving through the chute C and transporting the poultry from the front or loading end 11a of the chute C to the rear or unloading end 11b of such chute. The bearings 27a are preferably made from a suitable synthetic resin such as that sold under the trade name "Dalrin" or other suitable synthetic resin in order to reduce the friction and wear in such bearings, and eliminate the requirement for periodic lubrication of such bearings.

A plurality of lower rollers 28 are similarly mounted with bearings 28a of suitable synthetic resin to the lower roller rails 26a along the length of such roller rail and engage and support the belt B as such belt is returning from the unloading or rear end U of the poultry loading apparatus A to the inlet or front end I thereof.

The side support frames 21 extend from a lower end 21d to an upper portion 21e in a substantially straight line (FIG. 1), and from the upper portion 21e at an angle to an unloading end 21f. The angle or cant of the unloading portion 21f with respect to the upper portion 21e maintains the unloading portion of the poultry loading apparatus A in a substantially horizontal plane as the elevation of the loading apparatus A is adjusted in order to load poultry into the lowermost coops 10 and in the uppermost coops 10 on the vehicle V during the operation of the invention, thereby assisting the loaders or coopers in unloading or transferring the poultry from the loading apparatus A into the coops 10.

The lower end 21d of the side frames of the belt frame F are journalled in a slot or channel 66 (FIG. 6) of the trailer frame T and allow the chute C and conveyor belt frame F to move horizontally with respect to the trailer frame T as the elevation of the rear or unloading end of the chute C is adjusted, in order to load the poultry into higher or lower coops 10 on the vehicle V.

An axle 29a of a lower sprocket wheel 29 is mounted within the journal 66 and passes through the lower portion 21d of the side frames 21 of the belt support frame F and allows the belt support frame F and belt B to move horizontally with respect to the trailer frame T as the elevation of the rear or unloading end U of the apparatus A is being adjusted in a manner to be more set forth hereinafter.

A rear sprocket wheel 29b which together with sprocket wheel 29 drives the belt B in a manner to be set forth hereinafter, is mounted within a journal or channel 66b at the upper end 21 of the belt frame F. The axle 29c of the sprocket wheel 29b is slidingly movable in the journal 66b in order that the loader or cooper on the loading platform P may adjust the tension of the belt B in accordance with the number of poultry on the belt B, the speed of which they are being loaded, the restlessness or balkiness of the poultry, the number, if any, of poultry tangled or caught in the belt B, and other loading and unloading requirements of the apparatus A well known to those of ordinary skill in the art.

A plurality of unloading roller rails 224a are mounted with the horizontal support braces 22 within the unloading end 21f of the conveyor belt frame F, and have rollers 27 mounted by synthetic resin bearings 27a thereto. The rollers 27 support the belt B as such belt passes from the open end of the chute 11b towards the coopers or loaders on the platform P as the poultry are being unloaded.

A pair of enlarged rollers 227 are mounted with a bearing 227a, of a synthetic resin of the type previously set forth hereinabove, to the side support frames 21 of the belt frame F at the upper portion 21e where the unloading end 21f extends therefrom at an angle as previously set forth. The rollers 227 insure that proper tension is maintained in the belt B as the belt B moves upwardly from the lower end 21d and past the angle formed by the unloading end 21f at the upper portion 21e of the belt frame F.

The belt B is an endless conveyor belt of woven wire of a suitable gauge, for example 11 gauge wire, in order that the poultry being loaded grasp the belt B with their claws as they are being moved by the belt B through the chute C and thereby gain a sturdy and stable foothold and thus reduce the likelihood of undue movement or jostling by other poultry, and accordingly reduce the likelihood of injury to the poultry during the movement of the poultry. The woven wire of the conveyor belt B is preferably galvanized for longer life and ease in cleaning. Although the woven wire is sufficiently open for the poultry to grab such with their feet and maintain a sturdy foothold, the weave of the belt B is such that the bird's wings, necks and feet cannot pass therethrough, preventing breakage of such limbs of the poultry during the movement of the belt B and further reducing the likelihood of injury to the poultry during movement through the chute C.

The woven wire belt B also reduces undue jumping, flying or other undesirable movement of the poultry as the poultry are moved from the darkened interior 11e of the chute C at the unloading end 11b, since the poultry grasp the wire with their claws when startled, and thus the possibility of injury to the loaders, as well as to the poultry, from such undesirable movement, is reduced.

A plurality of support rods 30 which are of steel or suitable material are mounted within the woven wire belt B along the length of such belt, and strengthen and make the belt more sturdy and consequently longer lasting.

A chain belt 31 is mounted with the outside edges 32 of the woven wire belt B (FIG. 4), and engages the sprocket wheels 29 and 29b and is driven by such sprocket wheels to move the endless conveyor belt B through the chute C and move the poultry being loaded through the loading apparatus A. The sprocket wheels 29 and 29b are driven by a suitable prime mover such as an electrical motor, gasoline motor or other suitable motor.

The ground conveyor G (FIG. 6) also known as a starting conveyor, includes a ground conveyor belt 40 composed of a plurality of snowmobile tread belts. A sprocket wheel 41 is mounted on an axle 41a and the axle 41a is pivotally mounted within a mounting arm 42 attached to the axle 29a of the sprocket wheel 29.

The conveyor belt 40 is pivotally mounted to the belt B about the axle 41a in order that the ground conveyor G may be pivoted upwardly against the open loading end 11a of the chute C when the loading apparatus A of the present invention is being transported to a desired location for loading operations, and further to allow the ground conveyor G to pivot downwardly and into a position adjacent the ground in the turkey loading lot or pen L (FIG. 1 and 3) when the apparatus A of the present invention is being used for loading and unloading operations, as will be more evident later.

The sprocket wheel 41 drives the conveyor belt 40 of the ground conveyor G. The axle 41a of the sprocket wheel 41 is mounted with a mounting bracket 42a to which a support frame 44 of the ground conveyor G is mounted. A plurality of upwardly extending insertion sockets 44a are mounted with the outer edges of the frame 44, and provide space for the insertion of a plurality of mounting arms 45 (FIG. 1) of a side wall or loading chute wall 46. A pair of the side walls 46 are mounted along the belt 40 (FIG. 3) and guide and channel the poultry along the ground conveyor G onto the belt B for movement through the chute C to the coopers or loaders on the loading platform P.

A roller 47, which is mounted on an axle 47a, is adjustably mounted with respect to the frame 44 at the opposite end of the belt 40 from the sprocket wheel 41. The axle 47a is adjustably mounted with the frame 44 by a threaded connection or suitable movable connection, to allow the roller 47 to move with respect to the sprocket wheel 41 and adjust the tension in the belt 40 of the ground conveyor G in accordance with loading requirements such as those previously set forth hereinabove.

A wheel 48 which may be made of rubber or other suitable material is mounted with the axle 47a of the ground conveyor G and allows the ground conveyor G to move, as the loading end L of the apparatus A is moved as previously set forth, by rolling along the ground or earth in the turkey lot L.

The loading platform P is pivotally mounted at a connection 51 (FIG. 2) to the unloading portion 21f of the belt frame F, and includes a platform 52 on which the coopers or loaders stand as the poultry moving through the chute C are guided from the unloading end 11b into the coops 10 on the vehicle V in the operation of the invention. The platform 52 is preferably of mesh or woven wire in order that the feathers, droppings etc. from the poultry pass therethrough for health, safety and sanitation purposes, although a wood or solid metal platform might also be used if the health and sanitation problems are not critical.

The platform P is pivotally mounted to the unloading end U and pivots upwardly to a transportation position (FIG. 2) and is mounted at a socket 53a to a chain 53 and held in such position by the chain 53 when the loading apparatus A is being moved to a desired location for loading and unloading operations. The platform P is pivoted to an unloading position (FIG. 1) and mounted at a connection 54a to, held in such position by, a shock absorber hydraulic piston 54, or other suitable means such as a spring, during unloading operations in order that the coopers or loaders may stand on such platform and load the poultry into the vehicle V.

A prime mover control lever 55 and an elevation adjusting mechanism control lever 56 are mounted at the side of the chute C adjacent the loaders platform P, and allow the loader or cooper to control the speed of the prime mover motor and thus the speed of the belt B, and the position of the unloading end of the apparatus A, respectively, during loading and unloading operations in a manner to be more evident later.

The transport trailer frame T of the of the loading apparatus A includes a plurality of side support members 61, which are channel members made of steel or other suitable material. A forward or front portion 61a of the channel member 61 (FIG. 1) is canted slightly upwardly, allowing the inlet loading end I of the apparatus A to be moved closer to the ground during loading operation. A front horizontal brace or strut 62 and a rear horizontal brace or strut 62a are mounted between the side members 61. An additional horizontal mounting support 63 is mounted with the side support members 61 slightly rearwardly of the canted front portion 61a.

A tongue 68 is pivotally mounted at a pin 63a or other suitable connection in the center of the horizontal support member 63 and is connected by a ball and socket trailer connection 68a to a connection 90 on a tractor, truck or other suitable transportation vehicle 91 (FIG. 2) for towing and transportation of the loading apparatus A to a desired location for loading and unloading operations. A locking pin 68b or other suitable fastening means locks the tongue 68 in a firm and secure engagement with the horizontal brace 62 of the trailer frame T when the tongue is in a position of alignment with the longitudinal axis of the chute C (FIG. 2) during movement of the apparatus A to a desired location.

The locking pin 68b is released, and the tongue 68 pivoted or rotated, as indicated by the arrows in FIG. 3, to a position transverse, preferably substantially perpendicular to, the longitudinal axis of the chute C for performance of loading and unloading operations with the apparatus A. The tongue 68 is pivoted to a position transverse the longitudinal axis of the chute C and rearwardly canted portion 61a of the frame 61 in order to allow the tongue 68 to move from beneath the portion 61a and allow the front or inlet end I of the loading apparatus A to move closer to the ground (FIG. 1) than was permitted by the immovable forwardly extending connection mountings in the prior art loading apparatus, and thus allow the poultry being loaded to move more easily and freely onto the ground conveyor G, and eliminate the necessity of kicking or otherwise forcing the poultry onto the loading belt, with attendant bruises and downgrading of the quality of the flesh of the poultry.

A plurality of axles 67 are mounted to the trailer frame T intermediate the ends thereof, and suitable wheels 67a are mounted on such axles 67. Shock absorbers and springs, if desired, may also be mounted with the axle 67 and wheels 67a if a smooth ride and carriage of the apparatus A is desired when the apparatus A is moved to a desired location for use. A suitable set of brakes are provided for at least one of the axles 67 and connected with the braking system of the transport vehicle 91 in the well-known manner. The plurality of axles 67 overcomes the propensity of the prior art loading apparatus to pivotally move about the single axle used in such prior art apparatus as the position of such prior art apparatus A was being adjusted, and thus increases the stability and safety of the apparatus A of the present invention.

The elevation adjusting means E (FIG. 1 and 2) includes an upright or vertical support arm 71 pivotally mounted at a connection 71a to a bracket or lug 61c of the trailer frame T and mounted at an opposite end to a corner member 72. A hydraulic piston 75 is mounted at an upper end 75b to the corner member 72 and pivotally mounted at a lower end 75c to a raised bracket or lug 61d of the trailer frame T. An arm 75a of the piston 75 moves upwardly from the piston 75 as hydraulic fluid or liquid is forced into the piston 75 by a pump or other suitable means and supplies the force required to adjust the elevation of the apparatus A during loading and unloading operations. An horizontal support arm 73 is mounted at an end 73b to the corner member 72 and extends from such corner member at substantially a right angle to the upright member 71. The support arm 73 is pivotally mounted at an connection 73a to a lug or bracket 21g on the belt support frame F.

As the hydraulic fluid is supplied to the piston 75, the arm 75a of the piston is moved upwardly, causing the corner member 72 to rotate in a counterclockwise direction (FIG. 1) about the lug 61c. As such movement of the corner member 72 is taking place, the path of travel of the corner member 72 is the circumference of a circle drawn about the pivotal mounting with the lug 61c. Such movement of the corner member 72 draws the connection 73a between the horizontal arm 73 and the conveyor belt frame F rearwardly and upwardly, and the lower end 21d of the frame F moves within the journal 66 on the trailer frame T to insure such rearward upward movement of the chute C during adjustment of the elevation of the loading apparatus A and thereby may be used to insure that the loading platform P is substantially the same distance from the loading coops 10 at the uppermost portion of the vehicle V as from the loading coops 10 at the lowermost portion of the vehicle V during loading operations, to thereby insure ease in loading and unloading of the poultry in the operation of the present invention, if such feature is desired for use in the apparatus of the present invention.

The stabilizing support means S includes, in addition to the tandem axle 67, a plurality of support legs 81 each of which are mounted with a sleeve 61e (FIGS. 1—3) of the trailer frame T. A first aperture or passage 81a (FIG. 1) is formed in the support leg 81 at a lower end, and a plurality of upper passages or apertures 81b are formed in the upper end of the support leg 81 for the purposes of locking the support legs in a desired bracing position to support the loading apparatus A during loading and unloading operations. An aperture 61f is formed in each of the sleeves 61e, passing therethrough so that a locking pin (not shown), which may be a bolt and/or other suitable structure may pass through the aperture 61f and the desired apertures 81a or 81b of the support arm 81, to lock such leg in the desired bracing position.

When the locking pin is inserted in the lower aperture 81a and the aperture 61f of the sleeve 61 (FIG. 2), the support leg 81 is in a raised or elevated position and allows the apparatus A to be moved from one location to a new desired location for new loading operations to take place.

In situations where further enhanced stability of the apparatus A is desired, a second plurality of support brace arms 81 with apertures 81a and 81b therein are mounted with a plurality of sleeves 61g (FIG. 1A) forwardly of the lug 61d, and an additional horizontal brace 62b is mounted between the frame members 61 at a location 61h intermediate the axle 67 and the lug 61d. The sleeve 61g are mounted rearwardly of the location 61h.

The braces 62 and 62b and the portions of frame member 61 between the location 61h and the sleeves 61g form a detachable support base, rectangular in horizontal cross-section, mounted by a clasp 61j or other suitable locking connection to the frame member 61 adjacent the axles 67.

When it is desired to adjust the elevation of the unloading end U of the apparatus A, the support brace arms 81 within the sleeves 61e and 61g are moved to engage the surface on which the apparatus A is located, and pins inserted in the apertures in such sleeves and support brace arms to lock the support brace arms 81 in a bracing position. The detachable base member formed by the braces 62a and 62b and the rear portion of frame members 61 (FIG. 1A) is then detached from the trailer frame T, and a support base of enhanced stability, with four support brace arms 81 is provided to support and stabilize the apparatus A.

When the apparatus A of the present invention is being transported to a new location for loading and unloading operations, the support arm 81 is locked in a upper position (FIG. 2) by a pin inserted through the aperture 61f in the sleeve 61e and the aperture 81a in the arm 81, holding the support base pad 82 above the road or other surface over which the apparatus is being transported.

The loading platform P is mounted at the pivotal mounting 51 with the conveyor belt frame F and held in an upward position (FIG. 2) by a chain 53 which is mounted at the connection 53a to the platform P and at a second end 53b to the chute C or to a mounting bracket 12 of such chute. The platform holding spring or piston 54 is mounted to an alternate mounting 54a on the conveyor belt frame F to protect against undesired movement of such piston or spring during transportation of the apparatus A.

The elevation adjusting means E lowers the chute C and conveyor belt frame F to a position substantially adjacent the trailer frame T by withdrawal of hydraulic liquid or fluid from the piston 75 until the piston arm 75a is substantially contained in the piston 75 (FIG. 2) and the corner member 72 has pivoted downwardly forwardly in a clockwise direction (from the position of FIG. 1 to the position of FIG. 2) about the connection 71a with the bracket 61c of the trailer frame T and thereby permitting the upper arm 73 to pivot the conveyor belt frame F and chute C through the connection 73a with the bracket 21g downwardly forwardly (from the position of FIG. 1 to the position of FIG. 2) and thus lower the frame F and chute C into a transportation position with the trailer frame T.

A lock, pin, bolt or other suitable means (not shown) is provided to prevent undesired movement of the frame F and chute C with respect to the transport trailer frame T during movement thereof. The entrance panels or chute panels 46 are removed from the ground conveyor G and mounted with the chute C or in the vehicle 91, which might be a tractor, truck, or other suitable vehicle, transporting the apparatus A, and the ground conveyor belt 40 is pivoted counterclockwise upwardly and locked into position adjacent the open front end of entrance 11a of the chute C and held in such position by a lock or other suitable fastening means.

The tongue 68 of the trailer frame T is pivoted about its connection with the cross support member 63 until it is in a position of alignment with the longitudinal axis of chute C and locked into such position by the locking means 68b. The ball and joint trailer hitch 68a is then connected to the socket of the trailer connection 90a of the transporting vehicle 91.

In the operation of the present invention, when the loading apparatus A reaches the desired location for loading and unloading operations, the tongue 68 of the trailer frame T is disconnected from the socket connection 90 of the transportation vehicle and the tongue 68 unlocked by release of the locking means 68b from the trailer frame T and pivoted with respect to the support brace 63 to a position transverse the longitudinal axis of the trailer frame T, as indicated by the arrows in FIG. 3, and the front end of the loading apparatus A lowered to the ground adjacent a poultry lot or a pen L. The ground conveyor G is then released from its mounting with the chute C and pivoted downwardly in a clockwise direction (from the position of FIG. 2 to the position of FIG. 1) within the turkey lot or pen L, and the side panels or chute panels 46 mounted at the sides thereof.

The loading platform P is released at the connection 53a with the chain 53 and allowed to pivot counterclockwise with the support piston or cylinder 54 (FIG. 1). The locking pin is removed from the sleeve from the opening 61f in the sleeve 61e and the aperture 81a in the support arm 81 and the arm 81 allowed to move downwardly until the support base pad 82 reaches the ground or surface on which the apparatus A is to be operating. The pin is thereupon inserted into the aperture 61f and the sleeve 61e and through a suitable aperture 81b in the support brace arm 81 locking such support brace arm in a bracing position for loading and unloading operations.

Hydraulic fluid is then introduced into the piston 75 and forcing the arm 75a upwardly and adjusting the elevation of the chute C and frame F with respect to the ground and to the coops 10 of the vehicle V until the desired level of the unloading end or rear end U of the apparatus A is adjacent the desired coop 10 on the vehicle V.

The motor driving the belt B is then started and the belt B is driven by the sprocket wheels 29 and 29b driving the chain belt 31 at the periphery 32 of the belt B, with the sprocket wheel 41 of the ground conveyor G being driven by gears or other suitable connections with the sprocket wheel 29 of the belt B and driving the ground conveyor belt 40.

The poultry in the lot L are then herded or driven towards the ground conveyor G. Should the poultry become balky or unruly and stop or hesitate at the loading end of the ground conveyor G adjacent the wheels 48, the moving snowmobile tread on the ground conveyor belt 40 will grasp the birds and draw them forwardly onto the ground conveyor belt 40 and towards the open front end 11a of the chute C, thereby reducing the likelihood that the poultry will have to be kicked or otherwise forced into the chute C with the consequent bruising and damage to the poultry and the downgrading of the flesh of such poultry due to the bruises. The poultry are moved by the ground conveyor belt 40 and deposited or led into the open front end 11a of the chute C onto the moving woven wire conveyor belt B where the poultry grasp the links in the woven wire belt and obtain a firm and stable footing so that undue movement or jostling of the poultry during their transportation through the chute C does not occur, thereby further reducing the possibility of injury to the poultry during loading and unloading operations.

The poultry are then transported through the chute C to the rear or exit end 11b of the chute C where the coopers or loaders on the platform P guide or grasp the birds and move them into the appropriate coop 10 on the vehicle V. As the coops at a particular level on the vehicle V become full with poultry, the elevation of the platform P with respect to the vehicle is adjusted by the elevation adjusting means E to a new level of coops 10 so that further loading operations may take place.

On completion of the loading or unloading operations, the elevation of the chute C and frame F with respect to the trailer frame T is adjusted by lowering of the elevation adjusting means E by removal of the hydraulic fluid from the piston 75 until the chute C and frame F can be locked into position for transportation, the platform P is released from the spring 54 and pivoted upwardly and mounted with the chain 53 at an end 53a, the spring 54 is mounted an an end 54a to the frame F, and the base support arms 81 are moved upwardly and locked into a transport position by an insertion of a bolt through the aperture 61f and aperture 81a of the support 81 raising the support pad 82 above the ground.

The side panels 46 of the ground conveyor G are removed from the ground conveyor G and mounted to the chute C, and the ground conveyor belt 40 is pivoted upwardly into a locked position blocking the open front end 11a of the chute C. The tongue 68 of the trailer T is then pivoted from the position of the unloading (FIG. 3) counterclockwise in the direction of the arrows of FIG. 3 to a position of alignment with the longitudinal axis of the chute C and locked into such position by the locking means 68b. The tongue 68 is then connected by a ball and socket trailer hitch connection 68a to the trailer hitch connection 90 of the transport vehicle 91 and it is then ready for transportation to another desired location for loading and unloading operations.

Although the loading apparatus of the present invention has been described and disclosed as in the performance of loading and unloading operations, the loading apparatus A may also be used for vaccination purposes, and the personnel doing the vaccination or immunization stand on the loading platform P and the poultry are transported through the chute C to such personnel whereupon they are inoculated or vaccinated and returned to the poultry lot L. Similarly, the poultry can be artificially inseminated or fertilized by personnel on the platform P who perform the artificial insemination of the poultry and have the poultry transported to them through the chutes C of the loading apparatus A. Further, the unloading operations using the apparatus A is performed in substantially the same manner as the loading operation, with the direction of movement of the belt B and ground conveyor belt 40 reversed and the poultry are then extracted from the coops 10 on the vehicle V and deposited on to the rear end of the apparatus A into the open rear end 11b of the chute C and moved downwardly through the apparatus A and out the open front end 11a of the chute C on to the ground conveyor belt 40 where they are transported into the lot or pen L.

The foregoing disclosure and description of the invention are illustrative and explanatory thereof, and various changes in the size, shape, and materials as well as in the details of the illustrated construction may be made without departing from the spirit of the invention.

We claim:

1. A poultry loading apparatus for loading and unloading poultry, such as turkeys, chickens and the like into coops on a vehicle for shipment and like purposes, comprising:
   a. chute means through which the poultry are moved from an entrance in the poultry lot or pen to a discharge exit adjacent the coops for loading and unloading operations;
   b. conveyor belt means for moving the poultry through said chute means;
   c. means for adjusting the elevation of the exit of said chute means to a desire level adjacent the coops on the vehicle;
   d. transporting trailer frame means on which the loading apparatus is mounted for movement to desired locations for loading and unloading operations and supporting said chute means and conveyor belt means during loading and unloading operations; and
   e. said transporting trailer frame means comprising a pivotally mounted connector means for effecting towing movement of the apparatus by a suitable transportation vehicle, said connector means adapted to pivot to a first position of substantial alignment with the longitudinal axis of said trailer frame means when moving the apparatus to desired locations, for loading and unloading operations and to a second position during loading and unloading operations to thereby permit said entrance of said chute means to be positioned more closely to the surface of the poultry pen and facilitate movement of the poultry into said loading apparatus.

2. The structure of claim 1, further including:
   starting conveyor means mounted with said conveyor belt means and urging the poultry onto said conveyor belt means and thereby reducing the likelihood of injury and bruises to the poultry caused by kicking and otherwise forcing the poultry onto said conveyor belt means when they become unruly during loading and unloading operations.

3. The structure of claim 1, further including:
   stabilizing support means for keeping the loading apparatus stable when the exit of said chute means is elevated.

4. The structure of claim 3, wherein said stabilizing support means comprises:
   a plurality of support legs mounted with said transporting trailer frame means having support base pads at the lower end thereof and being adjustable in position to support said loading apparatus by bracing said apparatus during loading and unloading operations.

5. The structure of claim 4, further including:
a plurality of locking pins each adapted for insertion in one of said support legs to lock said legs in the desired bracing position to support said loading apparatus during loading and unloading operations.

6. The structure of claim 3, wherein said stabilizing support means comprises:
A plurality of axles on which the apparatus is moved to new locations, said axles mounted on said transporting trailer frame means to prevent pivoting movement of said trailer frame means during loading and unloading operations and during adjustment of the elevation of said chute means.

7. The structure of claim 1, wherein said conveyor belt means further includes:
a woven wire conveyor belt permitting the poultry being loaded to grasp the belt with their feet and obtain a stable footing as they are being moved through said chute means thereby reducing the likelihood of injury to the poultry during such movement.

8. The structure of claim 1, wherein said conveyor belt means further includes:
a woven wire conveyor belt having a plurality of supporting rods passing transversely therethrough for strength and support and permitting the poultry being loaded to grasp the belt with their feet and obtain a stable footing as they are being moved through said chute means thereby reducing the likelihood of injury to the poultry during such movement.

9. The structure of claim 1, wherein said conveyor belt means includes:
conveyor belt operation control means mounted adjacent the exit of said chute means to allow the poultry handlers at such exit to control the tension and speed of said conveyor belt means in accordance with loading and unloading requirements of said apparatus.

10. The structure of claim 1, wherein said chute means comprises:
a. a plurality of side walls extending upwardly from said conveyor belt means and enclosing the sides of such belt means along the length thereof; and
b. a roof extending between said side walls and enclosing said conveyor belt along the entire length of said chute thereby preventing the possibility of the poultry becoming entangled in slots or openings in the walls of said chute means.

11. In a mobile poultry loading apparatus mounted with a transporting trailer frame means wherein the poultry are moved through a chute along a conveyor belt from an entrance in a poultry lot to an adjustably elevated discharge exit adjacent coops on a vehicle for shipment, the improvement comprising:
a woven wire conveyor belt permitting the poultry being loaded to grasp the belt with their feet and obtain a stable footing as they are being moved through said chute means thereby reducing the likelihood of injury to the poultry during such movement.

* * * * *